United States Patent
Kaneda et al.

(10) Patent No.: US 7,446,997 B2
(45) Date of Patent: Nov. 4, 2008

(54) MULTI-LAYER CERAMIC CAPACITOR

(75) Inventors: Kazumi Kaneda, Takasaki (JP);
Shinsuke Takeoka, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 11/830,967

(22) Filed: Jul. 31, 2007

(65) Prior Publication Data

US 2008/0030921 A1 Feb. 7, 2008

(30) Foreign Application Priority Data

Aug. 2, 2006 (JP) ............................. 2006-232770

(51) Int. Cl.
*H01G 4/06* (2006.01)

(52) U.S. Cl. ................. 361/321.1; 361/321.2; 361/311; 361/313; 361/306.1; 361/306.2; 501/138; 501/139

(58) Field of Classification Search ............... 361/321.1, 361/321.2, 321.4, 321.5, 302–305, 306.1, 361/306.3, 311–313; 501/138, 139
See application file for complete search history.

(56) References Cited

U.S. PATENT DOCUMENTS

| | | | | |
|---|---|---|---|---|
| 6,051,516 A * | 4/2000 | Mizuno et al. | ............... | 501/138 |
| 6,346,497 B1 * | 2/2002 | Nakamura et al. | .......... | 501/138 |
| 6,396,680 B1 * | 5/2002 | Nishiyama et al. | .......... | 361/311 |
| 6,437,970 B1 * | 8/2002 | Lee et al. | .................... | 361/311 |
| 7,046,502 B2 * | 5/2006 | Murosawa et al. | ........ | 361/321.2 |
| 7,196,898 B2 * | 3/2007 | Osaka et al. | ............. | 361/321.1 |
| 7,242,571 B2 * | 7/2007 | Okamatsu et al. | ........ | 361/321.2 |

FOREIGN PATENT DOCUMENTS

| | | |
|---|---|---|
| JP | 63-265412 | 11/1988 |
| JP | 05-217426 | 8/1993 |
| JP | 10-212162 | 8/1998 |
| JP | 2001-39765 | 2/2001 |

* cited by examiner

*Primary Examiner*—Nguyen T Ha
(74) *Attorney, Agent, or Firm*—Knobbe Martens Olson & Bear LLP

(57) ABSTRACT

A multi-layer ceramic capacitor includes a plurality of dielectric ceramic layers; internal electrodes formed between the dielectric ceramic layers; and end termination electrodes electrically connected to the internal electrodes, wherein the dielectric ceramic layer is a sintered body constituted of a primary component that, when it is expressed by $ABO_3 + aRe_2O_3 + bMnO$, satisfies $1.000 \leq A/B \leq 1.035$, $0.05 \leq a \leq 0.75$ and $0.25 \leq b \leq 2.0$; and a subcomponent that includes at least one kind of B, Li or S in the range of 0.16 to 1.6 parts by mass in total in terms of $B_2O_3$, $Li_2O$ and $SiO_2$; and the internal electrode is constituted of Cu or a Cu alloy.

15 Claims, 1 Drawing Sheet

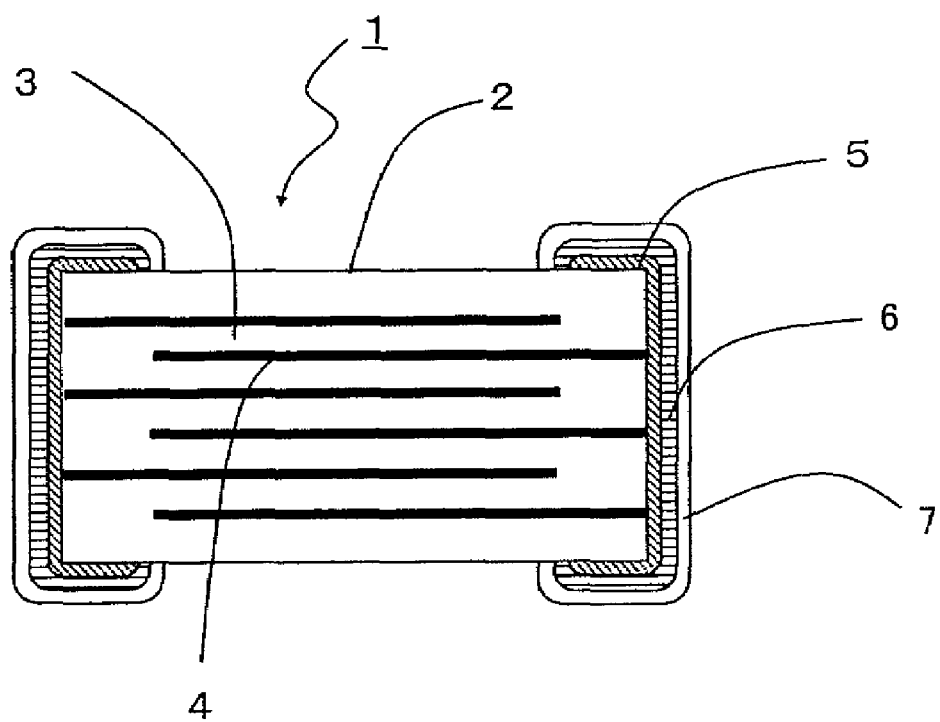

MULTI-LAYER CERAMIC CAPACITOR

BACKGROUND OF THE INVENTION

1. Field of the Invention

The present invention relates to a multi-layer ceramic capacitor of which an internal electrode is constituted of a base metal, in particular, to a multi-layer ceramic capacitor of which an internal electrode is constituted of Cu.

2. Description of the Related Art

Multi-layer ceramic capacitors used in electronic devices such as portable devices and telecommunications equipment are exposed to a demand for smaller size and larger capacitance. As such a small size and large capacitance multi-layer ceramic capacitor, there is a multi-layer ceramic capacitor such as shown in for instance JP-A No. 2001-39765, of which an internal electrode is constituted of Ni. Since such the multi-layer ceramic capacitor is necessary to sinter in a reducing atmosphere, to a $BaTiO_3$ base ceramic material that constitutes a dielectric ceramic layer, various additives are added to improve the reduction resistance. However, since, owing to addition of the additives, the sinterability of the ceramic material is deteriorated, a sintering temperature is set at a temperature of 1200° C. or more.

From the viewpoint of the energy efficiency, a multi-layer ceramic capacitor constituted of a material sinterable at a temperature such low as substantially 1000° C. is proposed. For instance, in JP-A No. 5-217426, a method where glass is added to lower the sintering temperature is proposed. However, when an additive amount of glass is increased to lower the sintering temperature, the permittivity is lowered; accordingly, a small size and large capacitance capacitor becomes difficult to obtain.

In JP-A No. 63-265412, a multi-layer ceramic capacitor that is constituted of a material that is capable of reducing and sintering at 1080° C. or less and has such high permittivity as 2000 or more is disclosed. In such multi-layer ceramic capacitor, Cu or an alloy mainly made of Cu can be used for an internal electrode. However, since the multi-layer ceramic capacitor uses Pb-perovskite type dielectrics in a primary phase of a dielectric ceramic layer, in recent lead-free tendency, there is a problem from the environmental point of view. Furthermore, JP-A No. 10-212162 discloses a multi-layer ceramic capacitor that is constituted of a lead-free material that can be sintered at 1080° C. or less. However, in the multi-layer ceramic capacitor, the permittivity is substantially 20 and lower than that of a $BaTiO_3$ base material; accordingly, it is difficult to obtain a small size and large capacitance multi-layer ceramic capacitor.

SUMMARY OF THE INVENTION

The invention is intended to provide, in an embodiment, a multi-layer ceramic capacitor that can be sintered at 1080° C. or less in a reducing atmosphere, does not contain Pb in a material of dielectric ceramic layer, has the permittivity of 2000 or more, has the temperature characteristics of the permittivity of the X7R characteristics and has the high temperature accelerated life characteristics same level as that of an existing Ni internal electrode multi-layer ceramic capacitor.

According to an embodiment, the invention provides a multi-layer ceramic capacitor that comprises a plurality of dielectric ceramic layers; internal electrodes formed opposed between the dielectric ceramic layers so as to be drawn alternately to different end surfaces; and end termination electrodes formed on both end surfaces of the dielectric ceramic layers and electrically connected to each of the internal electrodes. In the multi-layer ceramic capacitor, the dielectric ceramic layer may be a sintered body constituted of a primary component where when an expression of $ABO_3 + aRe_2O_3 + bMnO$ (wherein $ABO_3$ expresses perovskite dielectrics mainly made of $BaTiO_3$, $Re_2O_3$ is an oxide of at least one kind of metal selected from La, Ce, Pr, Nd, Sm, Eu, Gd, Tb, Dy, Ho, Er, Tm, Yb, Lu and Y and a and b express numbers of mol relative to 100 mol of $ABO_3$) is used, $1.000 \leq A/B \leq 1.035$, $0.05 \leq a \leq 0.75$ and $0.25 \leq b \leq 2.0$ are satisfied and a subcomponent that includes at least one kind of B, Li or Si in the range of 0.16 to 1.6 parts by mass in total in terms of $B_2O_3$, $Li_2O$ and $SiO_2$; and the internal electrode is constituted of Cu or a Cu alloy.

According to an embodiment of the invention, since a dielectric ceramic layer is made of a perovskite base dielectrics mainly made of BaTiO3, the permittivity is 2000 or more and the X7R characteristics can be satisfied. Furthermore, since a dielectric ceramic layer having the foregoing composition and an internal electrode constituted of Cu or a Cu alloy are combined, 1080° C. or less, desirably substantially 1000° C. can be used to sinter.

Furthermore, in an embodiment of the invention, a multi-layer ceramic capacitor in which, in the dielectric ceramic layer, a Cu compound is contained or Cu diffuses from an internal electrode and distributes is proposed.

According to an embodiment of the invention, since a Cu compound is contained in a dielectric ceramic layer or Cu diffuses from the internal electrode and distributes, a potential barrier of a grain boundary becomes higher and the insulating properties become higher; accordingly, the high temperature accelerated life characteristics can be improved.

According to an embodiment of the invention, a multi-layer ceramic capacitor that can be sintered at 1080° C. or less in a reducing atmosphere, does not contain Pb in a material of a dielectric ceramic layer, has the permittivity of 2000 or more, has the temperature characteristics of the permittivity of the X7R characteristics and has the high temperature accelerated life characteristics same level as an existing Ni internal electrode multi-layer ceramic capacitor can be obtained.

The present invention can equally be applied to a method of manufacturing the dielectric ceramics.

For purposes of summarizing the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWING

These and other features of this invention will now be described with reference to the drawings of preferred embodiments which are intended to illustrate and not to limit the invention. The drawings are oversimplified for illustrative purposes and are not to scale.

The FIGURE is a schematic sectional view showing a multi-layer ceramic capacitor of an embodiment of the invention.

DETAILED DESCRIPTION OF THE INVENTION

Preferred embodiments of a multi-layer ceramic capacitor according to the invention will be described with reference to the FIGURE. However, the preferred embodiments are not intended to limit the present invention.

A multi-layer ceramic capacitor 1 according to the embodiment, as shown in the FIGURE, includes a multi-layer ceramics 2 constituted of a plurality of dielectric ceramic layers 3 and internal electrodes 4 formed between the dielectric ceramic layers. On both end surfaces of the multi-layer ceramics 2, end termination electrodes 5 are formed so as to electrically connect with the internal electrodes, and, thereon, as needs arise, a first plating layer 6 and a second plating layer 7 are formed.

A dielectric ceramic layer 3 is constituted of a sintered body in which, to 100 mol of a perovskite dielectrics mainly made of $BaTiO_3$ of which A/B is in the range of 1.000 to 1.035, $Re_2O_3$ ($Re_2O_3$ is an oxide of at least one kind of metal selected from La, Ce, Pr, Nd, Sm, Eu, Gd, Tb, Dy, Ho, Er, Tm, Yb, Lu and Y) is contained in the range of 0.05 to 0.75 mol, MnO is contained in the range of 0.25 to 2.0 mol and at least one kind of B, Li or Si is added as a subcomponent in total in the range of 0.16 to 1.6 parts by mass in terms of $B_2O_3$, $Li_2O$ and $SiO_2$. As the perovskite system dielectrics, other than $BaTiO_3$, ones obtained by partially replacing Ba with Sr or Ca and ones obtained by partially replacing Ti with Zr can be cited. As to MnO, it is well to be in the composition range in terms of MnO; accordingly, a starting material may be $MnCO_3$ or $Mn_3O_4$. As a subcomponent that is a sintering aid, $Li_2O$—$SiO_2$ glass, $B_2O_3$—$SiO_2$ glass and $Li_2O$—$B_2O_3$—$SiO_2$ glass can be cited. A value of A/B is expressed by a ratio of total amounts of Ba and Ti contained in a sintered body including Ba and Ti contained in the perovskite system dielectrics and glass components.

An internal electrode 4 is constituted of Cu or a Cu alloy. As the Cu alloy, Cu—Ni alloy and Cu—Ag alloy can be cited. The internal electrode 4 is formed by printing a conductive paste on a ceramic green sheet by use of a screen printing method. The conductive paste contains, other than metal such as Cu or Cu alloy, in order to alleviate shrinkage difference with the sintering shrinkage of the dielectric ceramic layer 3, a ceramic material substantially same as a ceramic material constituting the dielectric ceramic layer 3. When, after sintering, a heat treatment is applied at a temperature of substantially 700° C. in an atmosphere of nitrogen, Cu can be diffused from the internal electrode 4 into the dielectric ceramic layer 3. Here, after the sintering means a second half process including a time when a temperature is lowered in the sintering process.

An end termination electrode 5 is constituted of Cu, Ni, Ag, Cu—Ni alloy or Cu—Ag alloy and can be formed by coating a conductive paste on a sintered multi-layer ceramic 2 and baking or by coating a conductive paste on an un-sintered multi-layer ceramic 2, followed by sintering simultaneously with the sintering of the dielectric ceramic layer 3. On the end termination electrode 5, by means of electroplating, plating layers 6 and 7 are formed. A first plating layer 6 has a function of protecting the end termination electrode 5 and is constituted of Ni or Cu. A second plating layer 7 has a function of improving the solder wettability and is constituted of Sn or an Sn alloy.

In the present disclosure where conditions and/or structures are not specified, the skilled artisan in the art can readily provide such conditions and/or structures, in view of the present disclosure, as a matter of routine experimentation. Also, in the present disclosure, the numerical numbers applied in embodiments can be modified by ±50% in other embodiments, and the ranges applied in embodiments may include or exclude the endpoints.

EXAMPLES

Advantages of the invention in embodiments will be verified based on examples below.

Example 1

As starting materials, in order that sintered bodies having compositions of table 1 may be obtained, $BaTiO_3$ (BT), MnO, rare earths ($Dy_2O_3$), additive (MgO) and a subcomponent that is a sintering aid (glass component or $SiO_2$) were prepared. In table 1, MnO, rare earths and additive are expressed by number of moles relative to 100 moles of BT, and the subcomponent that is a sintering aid is expressed by parts by mass of a total of at least one kind of $B_2O_3$, $Li_2O$ or $SiO_2$ relative to 100 parts by mass of BT. As the glass component, $0.45SiO_2$-$0.10B_2O_3$-$0.45Li_2O$ system glass was used. Numerals expressed in the glass components are expressed by mol percent.

TABLE 1

| | No. | Electrode | Composition | | | | | | |
|---|---|---|---|---|---|---|---|---|---|
| | | | Primary phase | Sintering aid | MnO | Rare earths | | Additive | | A/B |
| | 1 | Cu internal electrode | BT | Glass = 0.5 | 0.50 | $Dy_2O_3$ | 0.250 | — | — | 1.013 |
| * | 2 | Ni internal electrode | BT | Glass = 0.5 | 0.50 | $Dy_2O_3$ | 0.250 | — | — | 1.013 |
| * | 3 | Ni internal electrode | BT | $SiO_2$ = 1.5 | 0.30 | $Dy_2O_3$ | 0.375 | MgO | 0.5 | 1.015 |
| * | 4 | Ni internal electrode | BT | $SiO_2$ = 1.5 | 0.30 | $Dy_2O_3$ | 0.375 | MgO | 0.5 | 1.015 |
| * | 5 | Cu internal electrode | BT | Glass = 0.5 | 0.50 | $Dy_2O_3$ | 0.250 | — | — | 0.995 |
| | 6 | Cu internal electrode | BT | Glass = 0.5 | 0.50 | $Dy_2O_3$ | 0.250 | — | — | 1.000 |
| | 7 | Cu internal electrode | BT | Glass = 0.5 | 0.50 | $Dy_2O_3$ | 0.250 | — | — | 1.018 |
| | 8 | Cu internal electrode | BT | Glass = 0.5 | 0.50 | $Dy_2O_3$ | 0.250 | — | — | 1.035 |
| * | 9 | Cu internal electrode | BT | Glass = 0.5 | 0.50 | $Dy_2O_3$ | 0.250 | — | — | 1.040 |
| | 10 | Cu internal electrode | BT | Glass = 0.5 | 0.50 | $Dy_2O_3$ | 0.000 | — | — | 1.013 |
| | 11 | Cu internal electrode | BT | Glass = 0.5 | 0.50 | $Dy_2O_3$ | 0.050 | — | — | 1.013 |
| | 12 | Cu internal electrode | BT | Glass = 0.5 | 0.50 | $Dy_2O_3$ | 0.300 | — | — | 1.013 |
| | 13 | Cu internal electrode | BT | Glass = 0.5 | 0.50 | $Dy_2O_3$ | 0.750 | — | — | 1.013 |
| * | 14 | Cu internal electrode | BT | Glass = 0.5 | 0.50 | $Dy_2O_3$ | 1.000 | — | — | 1.013 |
| * | 15 | Cu internal electrode | BT | Glass = 0.5 | 0.15 | $Dy_2O_3$ | 0.250 | — | — | 1.013 |
| | 16 | Cu internal electrode | BT | Glass = 0.5 | 0.25 | $Dy_2O_3$ | 0.250 | — | — | 1.013 |
| | 17 | Cu internal electrode | BT | Glass = 0.5 | 0.75 | $Dy_2O_3$ | 0.250 | — | — | 1.015 |

TABLE 1-continued

| | No. | Electrode | Primary phase | Sintering aid | MnO | Rare earths | | Additive | | A/B |
|---|---|---|---|---|---|---|---|---|---|---|
| | 18 | Cu internal electrode | BT | Glass = 0.5 | 2.00 | $Dy_2O_3$ | 0.250 | — | — | 1.013 |
| * | 19 | Cu internal electrode | BT | Glass = 0.5 | 2.50 | $Dy_2O_3$ | 0.250 | — | — | 1.013 |
| * | 20 | Cu internal electrode | BT | Glass = 0.10 | 0.50 | $Dy_2O_3$ | 0.250 | — | — | 1.011 |
| | 21 | Cu internal electrode | BT | Glass = 0.16 | 0.50 | $Dy_2O_3$ | 0.250 | — | — | 1.011 |
| | 22 | Cu internal electrode | BT | Glass = 1.0 | 0.50 | $Dy_2O_3$ | 0.250 | — | — | 1.020 |
| | 23 | Cu internal electrode | BT | Glass = 1.6 | 0.50 | $Dy_2O_3$ | 0.250 | — | — | 1.020 |
| * | 24 | Cu internal electrode | BT | Glass = 1.8 | 0.50 | $Dy_2O_3$ | 0.250 | — | — | 1.021 |

* Outside of an embodiment of the invention

Prepared $BaTiO_3$, MnO, $Dy_2O_3$ and the sintering aid were wet mixed by use of a ball mill. In samples of Nos. 3 and 4, MgO was further added followed by wet mixing. After drying, mixtures were calcined at 400° C. for 2 hr in air, followed by pulverizing in dry, and thereby dielectric ceramic powders were obtained.

To the powder, polyvinyl butyral, an organic solvent and a plasticizer were added and blended to prepare a ceramic slurry. The ceramic slurry was formed into a sheet by use of a roll coater and thereby a ceramic green sheet having a thickness of 5 μm was obtained. On the ceramic green sheet, a paste for Cu internal electrode was coated by use of a screen printing method to form an internal electrode pattern. Here, for purpose of comparison, one in which a paste for Ni internal electrode was coated to form an internal electrode was prepared. Then, 20 sheets of the ceramic green sheets on each of which an internal electrode pattern was formed were stacked and pressure bonded, followed by cutting and dividing into a dimension of 4.0×2.0 mm, thereby raw chips were prepared. The raw chips were degreased in a nitrogen atmosphere, followed by sintering in a reducing atmosphere at a sintering temperature shown in table 2. A sintering pattern is a pattern where a temperature shown in the table was held for 2 hr, followed by lowering the temperature, changing an atmosphere to a nitrogen atmosphere at substantially 700° C. and holding there for 2 hr, still further followed by lowering to room temperature. After the sintering, a paste for Cu end termination electrode was coated on an exposed surface of the internal electrode, followed by burning in an inert gas. Of thus obtained multi-layer ceramic capacitors having a size of 3.2× 1.6 mm and a thickness of the dielectric ceramic layer of 4 μm, the sinterability, permittivity, temperature characteristics and high temperature accelerated life were measured and summarized in table 2. The sinterability was evaluated by means of an ink test. One that was permeated when it was dipped in ink was denoted by x. One that was not permeated was denoted by o. The permittivity was obtained by measuring electrostatic capacitance at 25° C. with an LCR meter, followed by calculating from an intersection area, a dielectrics thickness and the number of layers of the multi-layer ceramic capacitor that is a sample. Furthermore, as to the temperature characteristics, with the electrostatic capacitance at 25° C. as a reference, one of which variation of the electrostatic capacitance in the range of −55 to 125° C. was within ±15% (X7R) was taken as acceptable. Still furthermore, as to the high temperature accelerated life, 15 samples were tested at 150° C. under load of 15 V/μm, and one of which time when the insulation resistance became 1 MΩ or less was 48 hr or more was expressed with o.

TABLE 2

| | No. | Sintering temperature | Sintering | Electric Characteristics | | High Temperature Accelerated Life |
|---|---|---|---|---|---|---|
| | | | | Permittivity | Temperature Characteristics | |
| | 1 | 1000° C. | O | 2230 | X7R | O |
| * | 2 | 1000° C. | O | 2100 | X7R | x |
| * | 3 | 1300° C. | O | 2600 | X7R | O |
| * | 4 | 1080° C. | x | — | — | — |
| * | 5 | 1000° C. | O | 2350 | X7R | x |
| | 6 | 1000° C. | O | 2300 | X7R | O |
| | 7 | 1000° C. | O | 2070 | X7R | O |
| | 8 | 1000° C. | O | 2020 | X7R | O |
| * | 9 | 1000° C. | O | 1880 | X7R | — |
| * | 10 | 1000° C. | O | 2450 | X7R | x |
| | 11 | 1000° C. | O | 2380 | X7R | O |
| | 12 | 1000° C. | O | 2200 | X7R | O |
| | 13 | 1000° C. | O | 2050 | X7R | O |
| * | 14 | 1000° C. | x | — | — | — |
| * | 15 | 1000° C. | O | 2800 | X7S | — |
| | 16 | 1000° C. | O | 2500 | X7R | O |
| | 17 | 1000° C. | O | 2100 | X7R | O |
| | 18 | 1000° C. | O | 2010 | X7R | O |
| * | 19 | 1000° C. | x | — | — | — |
| * | 20 | 1000° C. | x | — | — | — |
| | 21 | 1000° C. | O | 2050 | X7R | O |
| | 22 | 1000° C. | O | 2060 | X7R | O |
| | 23 | 1000° C. | O | 2000 | X7R | O |
| * | 24 | 1000° C. | O | 1860 | X7R | — |

* Outside of the range of an embodiment of the invention

From results of Nos. 1 through 4, when an internal electrode was made of Cu, a multi-layer ceramic capacitor that has the permittivity of 2000 or more, satisfies the temperature characteristics of X7R and is excellent in the high temperature accelerated life was obtained. Ones of which internal electrode was made of Ni, as shown in Nos. 2 and 4, at 1000° C. or 1080° C., did not satisfy a desired level of the high temperature accelerated life or could not be sintered and, as shown in No. 3, in order to obtain a multi-layer ceramic capacitor that has the permittivity of 2000 or more, satisfies the temperature characteristics of X7R and has excellent high temperature accelerated life, a sintering temperature such high as 1300° C. was necessary.

From results of Nos. 5 through 9, one that is in the range of 1.000≦A/B≦1.035 could obtain a multi-layer ceramic capacitor that has the permittivity of 2000 or more, satisfies the temperature characteristics of X7R and is excellent in the high temperature acceleration life.

From results of Nos. 10 through 14, one in which the rare earth composition ratio, that is, a is in the range of 0.05 to 0.75 mol could obtain a multi-layer ceramic capacitor that has the permittivity of 2000 or more, satisfies the temperature characteristics of X7R and is excellent in the high temperature accelerated life.

From results of Nos. 15 through 19, one in which a composition ratio of MnO, that is, b is in the range of 0.25 2.0 mol could obtain a multi-layer ceramic capacitor that has the permittivity of 2000 or more, satisfies the temperature characteristics of X7R and is excellent in the high temperature accelerated life. The temperature characteristics, X7S, of No. 15 denote that the variation of the electrostatic capacitance in the range of −55 to 125° C. was ±22%, that is, outside of the standard of examples; accordingly, it was judged as unacceptable.

From Nos. 20 through 24, one where a subcomponent that is a sintering aid, that is, a glass component is in the range of 0.16 to 1.6 parts by mass could generate a multi-layer ceramic capacitor that has the permittivity of 2000 or more, satisfies the temperature characteristics of X7R and is excellent in the high temperature accelerated life.

From the above results, it was found that when a dielectric ceramic layer having a composition range of an embodiment of the invention and a Cu internal electrode are combined, a multi-layer ceramic capacitor that has the permittivity of 2000 or more, satisfies the temperature characteristics of X7R and is excellent in the high temperature accelerated life could be obtained.

Example 2

Similarly to example 1, so as to be able to obtain sintered bodies having compositions shown in table 3, dielectric ceramic powders were obtained. Here, kinds of rare earths were varied to verify effects.

The dielectric ceramic powders were, similarly to example 1, formed into multi-layer ceramic capacitors, followed by measuring the sinterability, the permittivity, the temperature characteristics and the high temperature accelerated life. Results are summarized in table 4.

TABLE 4

| No. | Sintering temperature | Sintering | Electric Characteristics | | High Temperature Accelerated Life |
|---|---|---|---|---|---|
| | | | Permittivity | Temperature Characteristics | |
| 25 | 1000° C. | O | 2020 | X7R | O |
| 26 | 1000° C. | O | 2040 | X7R | O |
| 27 | 1000° C. | O | 2050 | X7R | O |
| 28 | 1080° C. | O | 2050 | X7R | O |
| 29 | 1000° C. | O | 2090 | X7R | O |
| 30 | 1000° C. | O | 2080 | X7R | O |
| 31 | 1000° C. | O | 2010 | X7R | O |
| 32 | 1000° C. | O | 2110 | X7R | O |
| 33 | 1000° C. | O | 2220 | X7R | O |
| 34 | 1000° C. | O | 2200 | X7R | O |
| 35 | 1000° C. | O | 2180 | X7R | O |
| 36 | 1000° C. | O | 2170 | X7R | O |
| 37 | 1000° C. | O | 2150 | X7R | O |
| 38 | 1000° C. | O | 2200 | X7R | O |

It was found from the results that even when the kind of the rare earth was other than $Dy_2O_3$ or a mixture of two kinds of rare earths was used, as far as the composition range of an embodiment of the invention was satisfied, in a combination with a Cu internal electrode, a multi-layer ceramic capacitor that has the permittivity of 2000 or more, satisfies the temperature characteristics of X7R and is excellent in the high temperature accelerated life could be obtained.

TABLE 3

| No. | Electrode | Composition | | | | | | |
|---|---|---|---|---|---|---|---|---|
| | | Primary phase | Sintering aid | MnO | Rare earths | | | A/B |
| 25 | Cu internal electrode | BT | Glass = 0.5 | 0.50 | $La_2O_3$ | 0.15 | $Dy_2O_3$ 0.10 | 1.013 |
| 26 | Cu internal electrode | BT | Glass = 0.5 | 0.50 | $Ce_2O_3$ | 0.15 | $Dy_2O_3$ 0.10 | 1.013 |
| 27 | Cu internal electrode | BT | Glass = 0.5 | 0.50 | $Pr_2O_3$ | 0.15 | $Dy_2O_3$ 0.10 | 1.013 |
| 28 | Cu internal electrode | BT | Glass = 0.5 | 0.50 | $Nd_2O_3$ | 0.15 | $Dy_2O_3$ 0.10 | 1.013 |
| 29 | Cu internal electrode | BT | Glass = 0.5 | 0.50 | $Sm_2O_3$ | 0.15 | $Dy_2O_3$ 0.10 | 1.013 |
| 30 | Cu internal electrode | BT | Glass = 0.5 | 0.50 | $Eu_2O_3$ | 0.15 | $Dy_2O_3$ 0.10 | 1.013 |
| 31 | Cu internal electrode | BT | Glass = 0.5 | 0.50 | $Gd_2O_3$ | 0.15 | $Dy_2O_3$ 0.10 | 1.013 |
| 32 | Cu internal electrode | BT | Glass = 0.5 | 0.50 | $Tb_2O_3$ | 0.25 | — — | 1.013 |
| 33 | Cu internal electrode | BT | Glass = 0.5 | 0.50 | $Ho_2O_3$ | 0.25 | — — | 1.013 |
| 34 | Cu internal electrode | BT | Glass = 0.5 | 0.50 | $Er_2O_3$ | 0.25 | — — | 1.013 |
| 35 | Cu internal electrode | BT | Glass = 0.5 | 0.50 | $Tm_2O_3$ | 0.25 | — — | 1.013 |
| 36 | Cu internal electrode | BT | Glass = 0.5 | 0.50 | $Yb_2O_3$ | 0.25 | — — | 1.013 |
| 37 | Cu internal electrode | BT | Glass = 0.5 | 0.50 | $Lu_2O_3$ | 0.25 | — — | 1.013 |
| 38 | Cu internal electrode | BT | Glass = 0.5 | 0.50 | $Y_2O_3$ | 0.25 | — — | 1.013 |

Example 3

Similarly to example 1, so as to be able to obtain sintered bodies having compositions shown in table 5, dielectric ceramic powders were obtained. Here, other additives, compositions of the perovskite type dielectrics and subcomponents that become a sintering aid were varied to verify the advantages. In table 5, in expressions of the primary phase, Ca and Sr express a substitution amount (atomic percent) to Ba and Zr expresses a substitution amount (atomic percent) to Ti. That is, No. 47 is $Ba_{0.9}Ca_{0.1}TiO_2$; No. 48, $Ba_{0.9}Sr_{0.1}TiO_2$; and No. 49, $BaTi_{0.75}Zr_{0.25}O_2$.

TABLE 5

| No. | Electrode | Primary phase | | | Sintering aid | MnO | Rare earths | | Additive | | A/B |
|---|---|---|---|---|---|---|---|---|---|---|---|
| 39 | Cu internal electrode | BT | — | — | Glass = 0.5 | 0.25 | $Dy_2O_3$ | 0.25 | MgO | 0.20 | 1.013 |
| 40 | Cu internal electrode | BT | — | — | Glass = 0.5 | 0.25 | $Dy_2O_3$ | 0.25 | $Al_2O_3$ | 0.05 | 1.013 |
| 41 | Cu internal electrode | BT | — | — | Glass = 0.5 | 0.25 | $Dy_2O_3$ | 0.25 | $V_2O_5$ | 0.05 | 1.013 |
| 42 | Cu internal electrode | BT | — | — | Glass = 0.5 | 0.25 | $Dy_2O_3$ | 0.25 | $Cr_2O_3$ | 0.10 | 1.013 |
| 43 | Cu internal electrode | BT | — | — | Glass = 0.5 | 0.25 | $Dy_2O_3$ | 0.25 | $Fe_2O_3$ | 0.10 | 1.013 |
| 44 | Cu internal electrode | BT | — | — | Glass = 0.5 | 0.25 | $Dy_2O_3$ | 0.25 | $Co_2O_3$ | 0.10 | 1.013 |
| 45 | Cu internal electrode | BT | — | — | Glass = 0.5 | 0.25 | $Dy_2O_3$ | 0.25 | NiO | 0.15 | 1.013 |
| 46 | Cu internal electrode | BT | — | — | Glass = 0.5 | 0.25 | $Dy_2O_3$ | 0.25 | ZnO | 0.15 | 1.013 |
| 47 | Cu internal electrode | BT | Ca | 10.0 | Glass = 0.5 | 0.50 | $Dy_2O_3$ | 0.25 | — | — | 1.013 |
| 48 | Cu internal electrode | BT | Sr | 10.0 | Glass = 0.5 | 0.50 | $Dy_2O_3$ | 0.25 | — | — | 1.013 |
| 49 | Cu internal electrode | BT | Zr | 25.0 | Glass = 0.5 | 0.50 | $Dy_2O_3$ | 0.25 | — | — | 1.013 |
| 50 | Cu internal electrode | BT | — | — | $SiO_2$ = 0.5 | 0.50 | $Dy_2O_3$ | 0.25 | — | — | 1.013 |
| 51 | Cu internal electrode | BT | — | — | $B_2O_3$ = 0.5 | 0.50 | $Dy_2O_3$ | 0.25 | — | — | 1.013 |
| 52 | Cu internal electrode | BT | — | — | $Li_2O$ = 0.5 | 0.50 | $Dy_2O_3$ | 0.25 | — | — | 1.013 |

The dielectric ceramic powders were, similarly to example 1, formed into multi-layer ceramic capacitors, followed by measuring the sinterability, the permittivity, the temperature characteristics and the high temperature accelerated life. Results are summarized in table 6.

TABLE 6

| No. | Sintering temperature | Sintering | Permittivity | Temperature Characteristics | High Temperature Accelerated Life |
|---|---|---|---|---|---|
| 39 | 1000° C. | O | 2100 | X7R | O |
| 40 | 1000° C. | O | 2070 | X7R | O |
| 41 | 1000° C. | O | 2150 | X7R | O |
| 42 | 1000° C. | O | 2110 | X7R | O |
| 43 | 1000° C. | O | 2080 | X7R | O |
| 44 | 1000° C. | O | 2150 | X7R | O |
| 45 | 1000° C. | O | 2100 | X7R | O |
| 46 | 1000° C. | O | 2150 | X7R | O |
| 47 | 1000° C. | O | 2160 | X7R | O |
| 48 | 1000° C. | O | 2200 | X7R | O |
| 49 | 1000° C. | O | 2350 | X7R | O |
| 50 | 1000° C. | O | 2190 | X7R | O |
| 51 | 1000° C. | O | 2200 | X7R | O |
| 52 | 1000° C. | O | 2210 | X7R | O |

From the results, it was found that, as far as the composition range of an embodiment of the invention is satisfied, even when the additives are appropriately added or a composition of the perovskite system dielectrics is varied, by combining with a Cu internal electrode, a multi-layer ceramic capacitor that has the permittivity of 2000 or more, satisfies the temperature characteristics of X7R and is excellent in the high temperature accelerated life could be obtained. Furthermore, as to the subcomponent that becomes a sintering aid, it was found that at least one kind of B, Li or Si may well be contained.

Example 4

Similarly to example 1, so as to be able to obtain sintered bodies having compositions of table 7, dielectric ceramic powders were obtained. Here, an advantage when Cu is present in the dielectric ceramic layer was verified. The obtained dielectric ceramic powders were, similarly to example 1, formed into multi-layer ceramic capacitors, followed by measuring the sinterability, the permittivity, the temperature characteristics and the high temperature accelerated life. Results are summarized in table 7. A Cu compound CuO was used to add Cu.

TABLE 7

| | No | Primary component | Additive Re₂O₃ (additive amount of Re component) | | MnO | CuO | Sintering aid Glass | Internal electrode | Sintering (1000° C.) | Permittivity | High temperature accelerated life |
|---|---|---|---|---|---|---|---|---|---|---|---|
| * | 53 | BaTiO₃ | Dy | 0.5 | 0.5 | 0.5 | 0.4 | Ni | O | 2230 | x |
| * | 54 | BaTiO₃ | Dy | 0.5 | 0.5 | 1.0 | 0.4 | Ni | O | 2250 | x |
|   | 55 | BaTiO₃ | Dy | 0.5 | 0.5 | 0.5 | 0.4 | Cu | O | 2100 | O |
|   | 56 | BaTiO₃ | Dy | 0.5 | 0.5 | 0   | 0.4 | Cu | O | 2110 | O |
| * | 57 | BaTiO₃ | Dy | 0.5 | 0.5 | 0   | 0.4 | Ni | O | 2250 | x |
| * | 58 | BaTiO₃ | Dy | 1.0 | 0.5 | 0   | 0.4 | Ni | x | — | — |
| * | 59 | BaTiO₃ | Dy | 0.5 | 1.0 | 0   | 0.4 | Ni | x | — | — |
| * | 60 | BaTiO₃ | Dy | 1.5 | 0.5 | 0   | 1.0 | Ni | x | — | — |
| * | 61 | BaTiO₃ | Dy | 1.5 | 0.5 | 0   | 1.5 | Ni | O | 1300 | x |

* Outside of an embodiment of the invention

From the results, it was found that when the internal electrode was Ni, the high temperature accelerated life could not attain a desired level. When one having the Ni internal electrode was analyzed by use of EPMA, it was found that almost all of added CuO coexisted with the Ni internal electrode and did not exist in the dielectric ceramic layer. On the other hand, when the internal electrode was Cu, the high temperature accelerated life attained a desired level. When No. 55 was analyzed by use of an XAFS (X-ray Absorption Fine Structure Analysis) method, it was confirmed that Cu existed in the dielectric ceramic layer. Furthermore, No. 56 to which CuO was not added as well was confirmed that Cu existed in the dielectric ceramic layer. From this, Cu diffuses from the Cu internal electrode into the dielectric ceramic layer to heighten a potential barrier of the grain boundary and thereby the insulating properties are heightened to improve the high temperature accelerated life.

Furthermore, like Nos. 58 and 59, even when an additive amount is increased to improve the high temperature accelerated life more than No. 57, the sinterability is deteriorated. Even when the sintering aid is increased to improve the sinterability like Nos. 60 and 61, the permittivity is deteriorated. However, when Cu is used for the internal electrode like No. 56, even when an amount of the additive or sintering aid is suppressed to an amount that allows sintering at substantially 1000° C., the high temperature accelerated life can attain a desired level and high permittivity can be obtained.

From the above, when a dielectric ceramic layer of perovskite system dielectrics mainly made of BaTiO₃ and a Cu internal electrode are combined according to an embodiment of the invention, a multi-layer ceramic capacitor that can be sintered at 1080° C. or less, has the permittivity of 2000 or more, has the temperature characteristics of the permittivity of X7R and is excellent in the high temperature accelerated life can be obtained.

The present application claims priority to Japanese Patent Application No. 2006-232770, filed Aug. 2, 2006, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A multi-layer ceramic capacitor, comprising:
a plurality of dielectric ceramic layers;
internal electrodes formed opposed between the dielectric ceramic layers and extracted alternately to different end surfaces; and
end termination electrodes formed on both end surfaces of the dielectric ceramic layers and electrically connected to each of the internal electrodes, wherein
the dielectric ceramic layer is a sintered body constituted of a primary component that, when the primary component is expressed by $ABO_3 + aRe_2O_3 + bMnO$ (wherein ABO₃ expresses perovskite dielectrics mainly made of BaTiO₃, Re₂O₃ is an oxide of at least one kind selected from La, Ce, Pr, Nd, Sm, Eu, Gd, Tb, Dy, Ho, Er, Tm, Yb, Lu and Y and a and b express numbers of moles relative to 100 mole of ABO₃), satisfies $1.000 \leq A/B \leq 1.035$, $0.05 \leq a \leq 0.75$ and $0.25 \leq b \leq 2.0$; and a subcomponent that includes at least one kind of B, Li or Si in the range of 0.16 to 1.6 parts by mass in total in terms of B₂O₃, Li₂O and SiO₂; and
the internal electrode is constituted of Cu or a Cu alloy.

2. The multi-layer ceramic capacitor of claim 1, wherein the dielectric ceramic layer contains a Cu compound.

3. The multi-layer ceramic capacitor of claim 1, wherein Cu exists diffused and distributed in the dielectric ceramic layer.

4. A multi-layer ceramic capacitor comprising:
a plurality of dielectric ceramic layers stacked in a thickness direction and having two end surfaces opposite to each other formed by ends of the plurality of dielectric ceramic layers;
internal electrodes each formed between the respective dielectric ceramic layers stacked next to each other, said internal electrodes extending alternately from the respective two end surfaces; and
end termination electrodes formed on both of the two end surfaces and electrically connected to each of the internal electrodes extending therefrom, wherein each dielectric ceramic layer is a sintered body constituted of a primary component expressed by $$ABO_3 + aRe_2O_3 + bMnO$$

wherein $ABO_3$ expresses perovskite dielectrics mainly or substantially made of $BaTiO_3$, $Re_2O_3$ is an oxide of at least one kind selected from La, Ce, Pr, Nd, Sm, Eu, Gd, Tb, Dy, Ho, Er, Tm, Yb, Lu and Y and a and b express numbers of moles relative to 100 mole of $ABO_3$, wherein $1.000 \leq A/B \leq 1.035$, $0.05 \leq a \leq 0.75$, and $0.25 \leq b \leq 2.0$; and a subcomponent that includes at least one kind of B, Li or Si in the range of 0.16 to 1.6 parts by mass in total in terms of $B_2O_3$, $Li_2O$ and $SiO_2$ per 100 parts by mass of the primary component; and each internal electrode is constituted of Cu or a Cu alloy.

5. The multi-layer ceramic capacitor of claim 4, wherein the sintered body is constituted further of a Cu compound in the range of 0.1 to 1.0 parts by mass per 100 parts by mass of the primary component.

6. The multi-layer ceramic capacitor of claim 4, wherein Cu is diffused and distributed in each dielectric ceramic layer from the internal electrodes.

7. The multi-layer ceramic capacitor of claim 4, wherein the sintered body is constituted further of an additive in the range of 0.01 to 0.5 parts by mass per 100 parts by mass of the primary component.

8. The multi-layer ceramic capacitor of claim 4, which has a permittivity of 2000 or more and satisfies the X7R characteristics.

9. The multi-layer ceramic capacitor of claim 4, wherein each dielectric ceramic layer has a thickness of 1 μm to 10 μm.

10. The multi-layer ceramic capacitor of claim 4, wherein each dielectric ceramic layer contains no Pb.

11. The multi-layer ceramic capacitor of claim 4, wherein the primary component contains Sr or Ca partially substituting Ba and contains Zr partially substituting Ti.

12. The multi-layer ceramic capacitor of claim 4, wherein each dielectric ceramic layer satisfies $0.5 \leq a+b \leq 2.25$.

13. The multi-layer ceramic capacitor of claim 4, wherein the subcomponent is comprised of $Li_2O$—$SiO_2$ glass, $B_2O_3$—$SiO_2$ glass, and $Li_2O$—$B_2O_3$—$SiO_2$ glass.

14. The multi-layer ceramic capacitor of claim 4, further comprising a first plating layer on each end termination electrode for protecting the end termination electrodes.

15. The multi-layer ceramic capacitor of claim 14, further comprising a second plating layer on each first plating layer for improving solder wettability.

* * * * *